(12) United States Patent
Watson et al.

(10) Patent No.: US 11,455,901 B2
(45) Date of Patent: Sep. 27, 2022

(54) SYSTEM AND A METHOD FOR MONITORING PROGRESS OF A LEARNER THROUGH AN EXPERIENTIAL LEARNING CYCLE

(71) Applicant: Intersective Pty Ltd, Sydney (AU)

(72) Inventors: Susannah Watson, Redfern (AU); Nicole James, Sydney (AU); Philipp Laufenberg, Sydney (AU); William Emanuel Sonnenreich, Bondi (AU); Beau Leese, Redfern (AU)

(73) Assignee: Intersective Pty Ltd, Sidney (AU)

( * ) Notice: Subject to any disclaimer, the term of this patent is extended or adjusted under 35 U.S.C. 154(b) by 0 days.

(21) Appl. No.: 17/135,752

(22) Filed: Dec. 28, 2020

(65) Prior Publication Data

US 2021/0225187 A1  Jul. 22, 2021

Related U.S. Application Data

(63) Continuation of application No. 15/741,457, filed as application No. PCT/AU2016/050582 on Jul. 1, 2016, now abandoned.

(30) Foreign Application Priority Data

Jul. 3, 2015 (AU) ................................ 2015902614

(51) Int. Cl.
*G09B 5/12* (2006.01)
*G06Q 50/20* (2012.01)
(Continued)

(52) U.S. Cl.
CPC ............... *G09B 5/12* (2013.01); *G06Q 50/20* (2013.01); *G06Q 50/205* (2013.01); *G09B 5/14* (2013.01); *G09B 7/077* (2013.01); *H04L 67/535* (2022.05)

(58) Field of Classification Search
CPC . G09B 5/12; G09B 5/14; G09B 7/077; G06Q 50/20; G06Q 50/205; H04L 67/535
See application file for complete search history.

(56) References Cited

U.S. PATENT DOCUMENTS 5,871,211 A * 2/1999 Was .................... A61B 5/16
                                                  273/242
6,250,929 B1 * 6/2001 Kolb ................. G09B 19/0076
                                                  434/428

(Continued)

FOREIGN PATENT DOCUMENTS

JP  2001-305940 A  11/2001
JP  2014-178838 A   9/2014

(Continued)

OTHER PUBLICATIONS

Extended European Search Report from corresponding application EP 16820566.4, 10 pages, dated Apr. 1, 2019.

(Continued)

*Primary Examiner* — Malina D. Blaise
(74) *Attorney, Agent, or Firm* — Crowell & Moring LLP (57) ABSTRACT

A computer system for monitoring progress of at least one learner through an experiential learning cycle, the computer system comprising: a computer server accessible through a communications network, the computer server arranged to receive event data through the communications network from a user computing device, the event data being generated by the at least one learner progressing through the experiential learning cycle; a memory for storing empirical data indicative of the experiential learning cycle and event data received at the computer server through the communications network; and a processor configured to process the received event data and comparing the processed event data (Continued)

with the empirical data to determine the progress of the at least one learner through the experiential learning cycle.

12 Claims, 7 Drawing Sheets

(51) Int. Cl.
*H04L 67/50* (2022.01)
*G09B 5/14* (2006.01)
*G09B 7/077* (2006.01)

(56) References Cited

U.S. PATENT DOCUMENTS

| | | | |
|---|---|---|---|
| 9,753,965 B2* | 9/2017 | Rana | G06F 16/29 |
| 2003/0207238 A1* | 11/2003 | Latzina | G09B 7/02 |
| | | | 434/118 |
| 2004/0009462 A1* | 1/2004 | McElwrath | G09B 7/02 |
| | | | 434/350 |
| 2004/0018474 A1* | 1/2004 | D'Ippolito | G09B 3/00 |
| | | | 434/362 |
| 2004/0157193 A1 | 8/2004 | Mejias et al. | |
| 2006/0051730 A1* | 3/2006 | Dicken | G09B 5/04 |
| | | | 434/319 |
| 2010/0145870 A1* | 6/2010 | Luster | G06Q 50/20 |
| | | | 705/321 |
| 2011/0167080 A1* | 7/2011 | Henny | G06Q 20/10 |
| | | | 707/769 |
| 2013/0045468 A1* | 2/2013 | Wulf | G09B 19/0076 |
| | | | 434/247 |
| 2013/0096892 A1* | 4/2013 | Essa | G09B 7/00 |
| | | | 703/2 |
| 2014/0024009 A1 | 1/2014 | Nealon et al. | |
| 2015/0100303 A1 | 4/2015 | Danson et al. | |
| 2015/0206440 A1* | 7/2015 | Aylesworth | G06Q 50/20 |
| | | | 434/362 |
| 2015/0206441 A1* | 7/2015 | Brown | G09B 5/00 |
| | | | 434/319 |
| 2015/0206442 A1* | 7/2015 | Brown | G06Q 30/0621 |
| | | | 434/362 |
| 2022/0198957 A1* | 6/2022 | Poll | G09B 19/18 |
| 2022/0223280 A1* | 7/2022 | Ferro, Jr. | H04L 65/403 |

FOREIGN PATENT DOCUMENTS

| | | |
|---|---|---|
| KR | 10-2009-0130629 A | 12/2009 |
| WO | 2014/009918 A1 | 1/2014 |

OTHER PUBLICATIONS

Kayes, Anna B., et al., Experiential learning in teams, Journal Simulation and Gaming, Sep. 2005, vol. 36, No. 3, pp. 330-354.

Kolb, D.A., et *Experiential Learning: Experience as the Source of Learning and Development*, "Ch. 2: The Process of Experiential Learning," Prentice Hall, pp. 20-38 (1984).

International Search Report for corresponding International application No. PCT/AU2016/050582, dated Oct. 7, 2016.

Written Opinion of the International Searching Authority for corresponding International application No. PCT/AU2016/050582, dated Oct. 7, 2016.

* cited by examiner

| Phase | $P_a$ | $P_b$ | $P_c$ | $P_d$ |
|---|---|---|---|---|
| Expectation | $Ex_1$ | $Ex_2 = 2Ex_1$ | $Ex_3 = 3.5Ex_1$ | $Ex_4 = 2Ex_1$ |
| Phase Probability | $Pp_a = 0\%$ | $Pp_b = 20\%$ | $Pp_c = 40\%$ | $Pp_d = 60\%$ |
| Phase Velocity | $Pv_a = -20\%$ | $Pv_b = -20\%$ | $Pv_c = -20\%$ | $Pv_d = +40\%$ |

Event: $E_1$ $E_2$ $E_3$ $E_4$ $E_5$ $E_6$ → $Pre_1$ $Pre_2$ $Pre_3$ → $Pre_4$ $E_6$:
Timestamp = 2015-05-27 12:00:00
Classes [ $C_1 = p_a$, $C_2 = $ Chat ]
State [ User = 'Jane', Program =X101]
Data [ "Hi jim, yes I finished the assignment"]
Contexts [ $E_3$, $E_5$ ]
Scores [ $M_1 = 7$, $M_2 = .8$ ]

$Pre_3$:
Timestamp = 2015-05-27 11:59:50
Half-Life = 6000 seconds
Classes [ $C_1 = p_a$, $C_2 = $ Chat ]
Scores [ $M_1 > 4$, $M_2 > .5$ ]
Matches [ $E_6$ ]

Metric: $M_1 = $ wordcount()   $M_2 = $ sentiment()

SYSTEM AND A METHOD FOR MONITORING PROGRESS OF A LEARNER THROUGH AN EXPERIENTIAL LEARNING CYCLE

CROSS REFERENCE TO RELATED APPLICATIONS

This application is a continuation of U.S. application Ser. No. 15/741,457, having a 371(c) date of Jan. 2, 2018, which is the U.S. National Phase of PCT International Application PCT/AU2016/050582, filed on Jul. 1, 2016, which claims priority to Australian application No. 2015902614, filed Jul. 3, 2015, which are each incorporated by reference herein in their entirety.

TECHNICAL FIELD

The present disclosure generally relates to a computer system, a computer implemented method and software for monitoring progress of at least one learner through an experiential learning cycle.

BACKGROUND

Experiential learning is "the process whereby knowledge is created . . . from the combination of grasping and transforming experience" (Kolb 1984, p. 41). Experiential learning cycles describe the flow of grasping and transforming experiences—both internally and externally. One example of an experiential learning cycle is the Kolb cycle. According to the Kolb cycle, an external concrete experience occurs, is internally reflected upon, internally conceptualised in an abstract manner which leads to external active experimentation. This triggers the next concrete experience. As such, the environment external to a learner is as important a factor in experiential learning as is the learner's internal mental processes and state.

Conventional learning assessment and support processes do not account for the interplay between the external environment and the learner, which is innate to experiential programs. For example, a student may present to an industry expert for assessment. The expert feels the student has demonstrated great understanding and gives positive feedback, but the student has performed poorly against specific formal assessment criteria and receives a poor mark. Resolving this situation from a support and learning outcomes perspective requires greater context than the formal learning assessment process collects.

SUMMARY

A computer system for monitoring progress of at least one learner through an experiential learning cycle, the computer system comprising:
 a computer server accessible through a communications network, the computer server arranged to receive event data through the communications network from a user computing device, the event data being generated by the at least one learner progressing through the experiential learning cycle;
 a memory for storing empirical data indicative of the experiential learning cycle and event data received at the computer server through the communications network; and
 a processor configured to process the received event data and comparing the processed event data with the empirical data to determine the progress of the at least one learner through the experiential learning cycle.

If a result of the comparison meets a predetermined criteria, the processor may further be configured to automatically trigger an intervention.

The computer server may be configured to automatically make information in relation to the triggered intervention available on one or more user computing devices through the communications network. For example, the user computing device may be associated with the at least one learner or one or more other users, such as other learners and educators. When an intervention is triggered, the computer server may automatically generate the information in relation to the intervention that is communicated through the communications network to one or more user computing devices.

The computer server may facilitate at least one learner to progress through the experiential learning cycle by providing an education program. In this regard, the computer server may be configured to make information indicative of the education program accessible through the communications network to the at least one learner on the user computer device.

Alternatively, the computer server may facilitate communication with a learning platform that provides the education program to the at least one leaner.

The experiential learning cycle may comprise a plurality of learning phases. The processor may be configured to process the received event data to determine at least one of the plurality of learning phases of the experiential learning cycle in which the learner currently is. In addition, the computer server may be configured to process the received event data to determine a phase probability that is indicative of a likelihood that the at least one learner is currently in the at least one determined learning phase.

The processor may be configured to process the collected data to determine a phase velocity of the at least one learner, the phase velocity being indicative of a pace of the at least one learner progressing through the plurality of learning phases of the experiential learning cycle.

The processor may further be configured to process the received event data and compare the processed event data with stored event data to generate prediction data indicative of one or more future events. The stored event data may comprise historical event data generated by the at least one learner and/or one or more other learners and/or one or more educators. The generated prediction data may then be compared with the empirical data to evaluate the generated prediction data. If a result of the comparison meets predetermined criteria, the computer server may be configured to automatically trigger an intervention.

The processor may further be configured to match received event data with generated prediction data. If an event matches a prediction, the prediction data may be stored as empirical data.

The processor may be configured to compare at least one of the determined learning phase and the determined phase velocity of the at least one learner with the empirical data to evaluate the progress of the at least one learner through the experiential learning cycle. If a result of the comparison exceeds a predetermined threshold, an intervention may automatically be triggered by the processor. The processor may further be configured to use the evaluation of the progress of the at least one learner to generate a rating for the at least one learner.

The processor may be configured to compare the determined process of the at least one learner with a predetermined outcome of the experiential learning cycle. If a result of the comparison meets predetermined criteria, an intervention may automatically be triggered by the processor.

The event data may comprise at least one of: a time stamp, a type of event, a virtual location of the generated event, content information indicative of the length of the event or sentiment, for example, and association information such as an association to one or more other learners, an educator, or one or more other events.

The experiential learning cycle may comprise an embedded derivative experiential learning cycle. In this regard, the processor may be configured to process the received event data to determine whether the at least one learner is currently in a derivative experiential learning cycle. In this case, an intervention may automatically be triggered. The experiential learning cycle may be associated with one or more additional experiential learning cycles through which the at least one learner progresses. In this regard, the processor may be configured to process the received event data to isolate the cycles and evaluate the progress and need for intervention independently as well as collectively.

In an embodiment, the experiential learning cycle of the at least one learner may be interdependent with an experiential learning cycle of at least one other learner.

The memory may further store data associated with the results of the determinations, evaluations generations of the processor.

A computer implemented method of monitoring progress of at least one learner through an experiential learning cycle, the method comprising:

providing empirical data indicative of the experiential learning cycle;

facilitating access to the computer through a communications network;

receiving event data at the computer through the communications network from a user computing device, the event data being generated by the at least one learner progressing through the experiential learning cycle; and processing the received event data and comparing the processed event data with the empirical data to determine the progress of the at least one learner through the experiential learning cycle.

The method may comprise a step of facilitating the at least one learner to progress through the experiential learning cycle by providing an education program. In this regard, information indicative of the education program may be made accessible through the communications network to the at least learner on the user computer device.

Alternatively, the method may comprise a step of facilitating communications with a learning platform that provides the education program to the at least one learner.

The experiential learning cycle may comprise a plurality of learning phases. The step of processing the received event data may be conducted to determine at least one of the plurality of learning phases of the experiential learning cycle in which the learner currently is. In addition, the step of processing the received event data may further comprise determining a phase probability that is indicative of a likelihood that the at least one learner is currently in the at least one determined learning phase.

In an embodiment of the present disclosure, the step of processing the collected data may be conducted to determine a phase velocity of the at least one learner, the phase velocity being indicative of a pace of the at least one learner progressing through the plurality of learning phases of the experiential learning cycle.

The method may comprise a step of processing the received event data and comparing the processed event data with stored event data to generate prediction data indicative of one or more future events. The stored event data may comprise historical event data generated by the at least one learner and/or one or more other learners and/or one or more educators. The generated prediction data may be compared with the empirical data to evaluate the generated prediction data. If a result of the comparison exceeds a predetermined threshold, an intervention may automatically be triggered.

The method may further comprise a step of matching received event data with generated prediction data. If an event matches a prediction, the prediction data may be stored as empirical data.

The method may comprise a step of comparing at least one of the determined phase and the determined phase velocity of the at least one learner with the empirical data to evaluate the progress of the at least one learner through the experiential learning cycle. If a result of the comparison meets a predetermined criteria, an intervention may automatically be triggered. The method may further comprise a step of using the evaluation of the progress of the at least one learner to generate a rating for the at least one learner.

In an embodiment, the method may comprise a step of comparing the determined process of the at least one learner with a predetermined outcome of the experiential learning cycle. If a result of the comparison meets a predetermined criteria, an intervention may automatically be triggered.

Information in relation to the triggered intervention may automatically be made available on one or more user computing devices through the communications network. For example, the user computing device may be associated with the at least one learner or one or more other users, such as other learners and educators. When an intervention is triggered, the information in relation to the intervention may automatically be generated.

The event data may comprise at least one of: a time stamp, a type of event, a virtual location of the generated event, content information indicative of a length of the event or sentiment, for example, and association information such as an association to one or more other learners, an educator or one or more other events.

The experiential learning cycle may comprise an embedded derivative experiential learning cycle. In this regard, the method may comprise a step of processing the received event data to determine whether the at least one learner is in a derivative experiential learning cycle. In this case, an intervention may automatically be triggered.

The experiential learning cycle of the at least one learner may be interdependent with an experiential learning cycle of at least one other learner.

Software, that when executed by a computer system causes the computer system to perform the method described above.

DESCRIPTION OF EMBODIMENTS

Embodiments of the present disclosure generally relate to a computer system and a computer implemented method for monitoring progress of at least one learner through an experiential learning cycle. In this regard, access to the computer system is facilitated through a communications network such as the Internet. In a memory of the computer systems, empirical data indicative of the experiential learning cycle is stored. The learning cycle may for example have a plurality of learning phases and be associated with interdependent experiential learning cycles of other learners. Event data that is generated by one or more learners is received at the computer system through the communications network. Event data may for example comprise a chat message, a post on a group board, the request for a meeting or the like. This event data is processed and compared to the empirical data to determine the progress of the learner through the experiential learning cycle.

Embodiments of the present disclosure may find application in any experiential learning situation, such as at university, school, internships, and within corporations.

Embodiments of the present disclosure provide significant advantages. In particular, the computer system may provide an objective system for monitoring the progress of a learner through an experiential learning cycle. Furthermore, the computer system may enable an adequate support system in the form of interventions to provide feedback to the learners and assist the learners to progress through the experiential learning cycle.

For some experiential learning cycles, the educator may not know what the correct outcome of a learning phase may be. In this regard, the computer system analyses the event data and determines the outcome of the experiential learning cycle or at least a phase of the experiential learning cycle. The rating of a learner would be automatic and personal emotions of the educator can significantly be reduced from the process of rating a learner.

Figure 1:
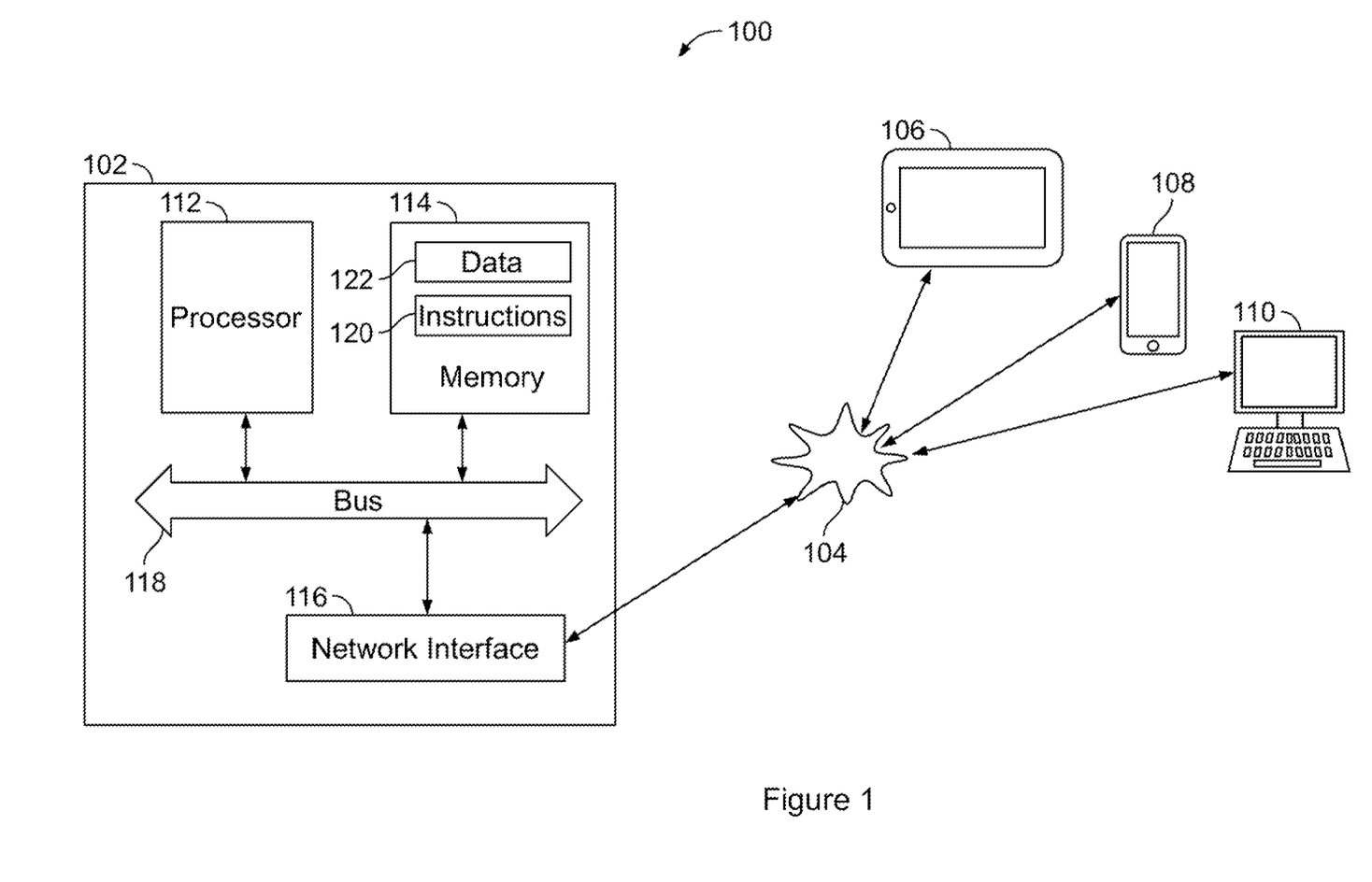
FIG. 1 is a schematic representation of a system for monitoring progress of at least one learner through an experiential learning cycle in accordance with an embodiment of the present disclosure.

Referring initially to FIG. 1 of the accompanying drawings, there is shown a computer system 100 for monitoring progress of at least one learner through an experiential learning cycle. The computer system 100 comprises a computer server 102 which is accessible through a communications network, such as the Internet 104, from user computing devices 106, 108, 110. In this example, the user computing devices 106, 108, 110 include a tablet computer 106, a smartphone 108, and a personal computer 110. However, any communications enabled computing devices that are capable of communicating with the computer server 102 are envisaged, such as a laptop computer or PDA.

In the present example, the computer server 102 includes a processor 112 arranged to control and coordinate operations, a memory 114, and a network interface 116 that communicate with each other via a bus 118. The network interface 116 facilitates wireless communications between the computer server 102 and the user computing devices 106, 108, 110 through the Internet 104. Specifically, the computer server 102 is accessible by the user computing devices 106, 108, 110 through web pages served to the user computing devices 106, 108, 110. This may be realised by software implemented by the processor 112, and through an application programming interface (API) that communicates with the user computing devices 106, 108, 110 using a dedicated application installed on the user computing devices 106, 108, 110.

The memory 114 stores instructions 120 and data 122 for the processes as described in the following, and the processor 112 performs the instructions 120 from the memory 114 to implement the processes. It should be noted that although the computer server 102 is shown as an independent network element, the computer server 102 may alternatively be part of another network element and functions performed by the computer server 102 may be distributed between multiple network elements.

Figure 2:
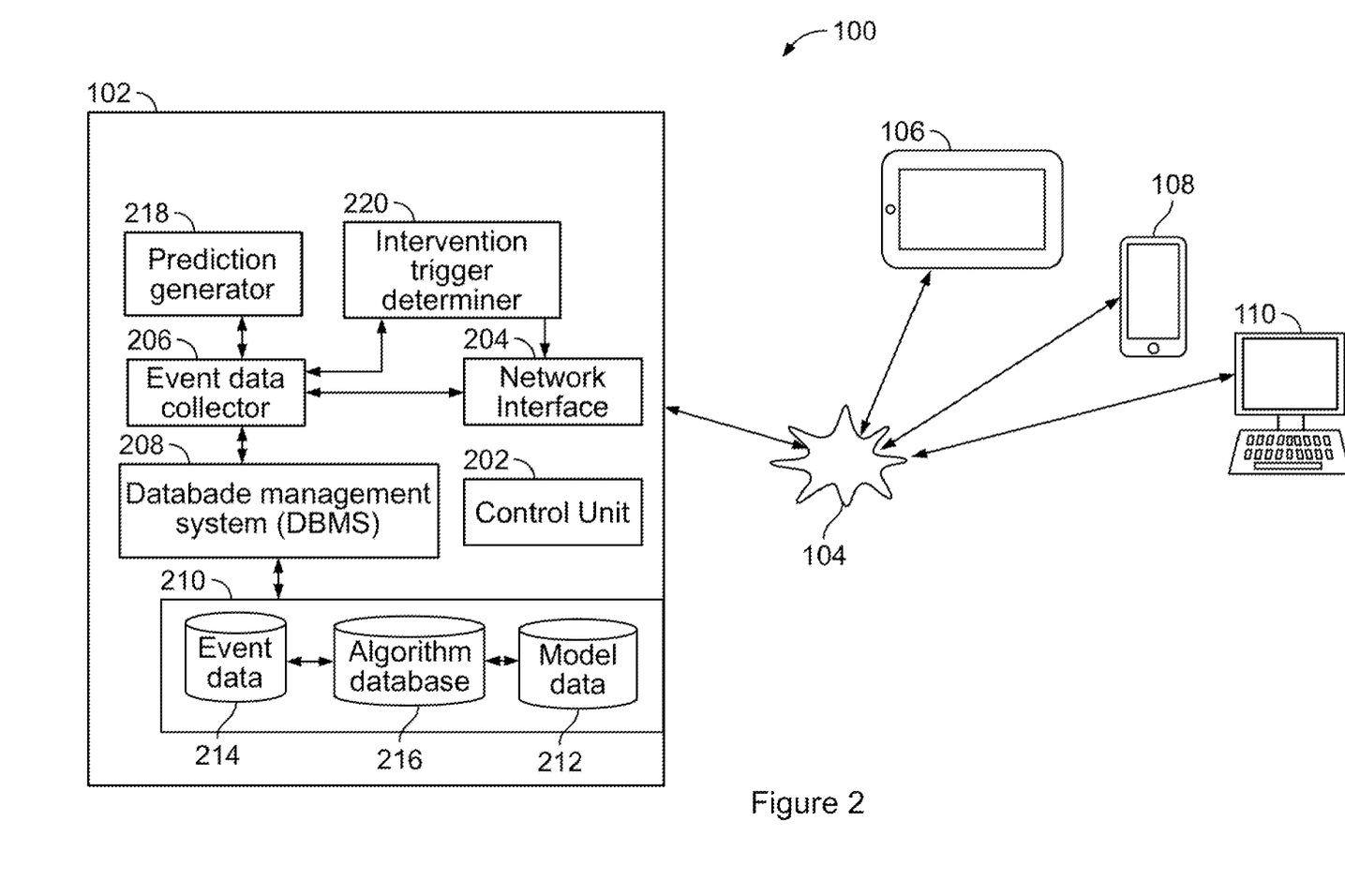
FIG. 2 is an alternative representation of the system of FIG. 1.

A representation of an example implementation of the computer system 100 is shown in FIG. 2, with functional components of the computer server 102 shown instead of hardware components. The functional components in this example may be implemented using the hardware components shown in FIG. 1 such that network interfaces are provided for facilitating communications with remote user computing devices 106, 108, 110 and implementing actions in response to the communications.

In this example, the computer system 100 comprises a learning platform 102 that facilitates at least one user to progress through a learning cycle using a user computing device, such as the user computing devices 106, 108, 110. For example, the learning platform 102 may provide an education program including scheduled tasks and assignments to guide at least one user through an experiential learning cycle to achieve a predetermined outcome. Alternatively, the computer system 100 may be in communication with a learning platform that provides the education program.

Referring back to the example shown in FIG. 2, the computer system 100 comprises a control unit 202 for controlling and coordinating operations of the components of the learning platform 102. This control unit 202 may for example be implemented by the processor 112 shown in FIG. 1.

Further, the learning platform has a network interface 204 for facilitating communications through a communications network 104, such as the Internet between the learning platform 102 and a remote computing device, such as user computing devices 106, 108, 110. In this example, a web server (not shown) of the learning platform 102 is arranged to serve one or more webpages to the user computing device, such as user computing devices 106, 108, 110, that can be accessed through a browser installed on the user computing device thereby facilitating communications with the learning platform 102.

The learning platform 102 is configured to receive at an event data collector 206 event data that is generated by at least one learner using a computing device, such as one of the computing devices 106, 108, 110. Exemplary event data may for example comprise a chat message, an adjustment of a slider, a submission of an assessment, and a post on a board. Event data may alternatively be generated by speech recognition technology and recording of an audio.

In this example, the learner enters the event data into a web page displayed on the user computing device 106, 108, 110 that is served by a web server of the learning platform 102. Alternatively, the event data may be received by importing data from a remote database such as a remote learning platform.

The learning platform 102 further comprises a data base management system ("DBMS") 208 that stores data that is received and/or generated in the learning platform 102 in a data storage 210. It will be understood that the data may alternatively be stored in a remote database, such as in a cloud storage and can be received at the learning platform 102 through the Internet 104 via the network interface 204.

Empirical data 212 indicative of an experiential learning cycle may be stored in the data storage 210 and is accessible by the DBMS 208.

The Experiential Learning Cycle

The empirical data may comprise data indicative of an experiential learning cycle. One exemplary experiential learning cycle was proposed by David Kolb which will be used as an example to describe the present disclosure. However, other experiential learning cycles are envisaged.

In the Kolb Cycle there are four phases that a learner progresses through:

Concrete Experience (CE): the learner undergoes an experience, often as a result of a direct action from the fourth phase (AE). This has an internalised impact on the learner;

Reflective Observation (RO): the learner observes the consequences of the action and reflects on what was intended and unintended, as well as the learner's own internal changes in feeling from the experience;

Abstract Conceptualization (AC): the learner generalises from observation and connects this with/seeks out knowledge to better understand what happened. The learner is generally focused on what didn't work as intended or how the result can be improved;

Active Experimentation (AE): the learner plans for, or sets up the next set of actions that will trigger a new experience.

A learner's progression through the experiential learning cycle may slow down or stop in a phase of the cycle, or the learner may skip one or more phases. This is particularly likely when there is a high degree of ambiguity or there are multiple learners that need to collaborate and therefore move through the experiential learning cycle together.

Furthermore, the learner may progress through a plurality of experiential learning cycles. For example, the experiential learning cycle may comprise an embedded sub-cycle. For example, within a phase of the experiential learning cycle an obstacle, such as a team communication issue or a communication issue with a teacher, may trigger a new, derivative cycle in which the issue is worked through and resolved. Embedded sub-cycles may be identified using statistical analysis of engagement patterns of the one or more learners compared against engagement patters of learners that are progressing through the primary experiential learning cycle only. In particular, the presence of this new derivative cycle may be identified by collecting a significant divergence in event data at the event data collector 206 in comparison to predicted event data generated at the prediction generator 218. Exemplary algorithm for determining the presence of such derivative cycle may include a multi-class algorithm and an algorithm using the cross-entropy method. In this way, event data associated with the primary learning cycle may be isolated from event data associated with the derivative cycle. In this example, event data may be generated by the learners of the team that are indicative of meeting requests and chat messages with a negative sentiment score which indicates an issue being worked through. Therefore, a learner may have several experiential learning cycles happening in parallel, and the experiential learning cycles may impact each other.

Outcomes and experiences of an experiential learning cycle for each learner appear to be highly dependent on the quality and timeliness of support, for example in the form of an intervention. Support may be needed to continue or accelerate the progress of the learner through the experiential learning cycle, or rewind one or more learning phases of the experiential learning cycle when a learning phase was skipped.

In this example, the Kolb cycle is used to construct computational empirical data of an experiential learning cycle. In this regard, a probabilistic representation of the learning is chosen as it is assumed that a learner may rarely be completely in one phase or another. Furthermore, the different learning phases of the experiential learning cycle such as the Kolb cycle are only approximations of a learner's internal state of mind. There are no externally visible signals that help to identify exactly what is happening.

Figure 3:
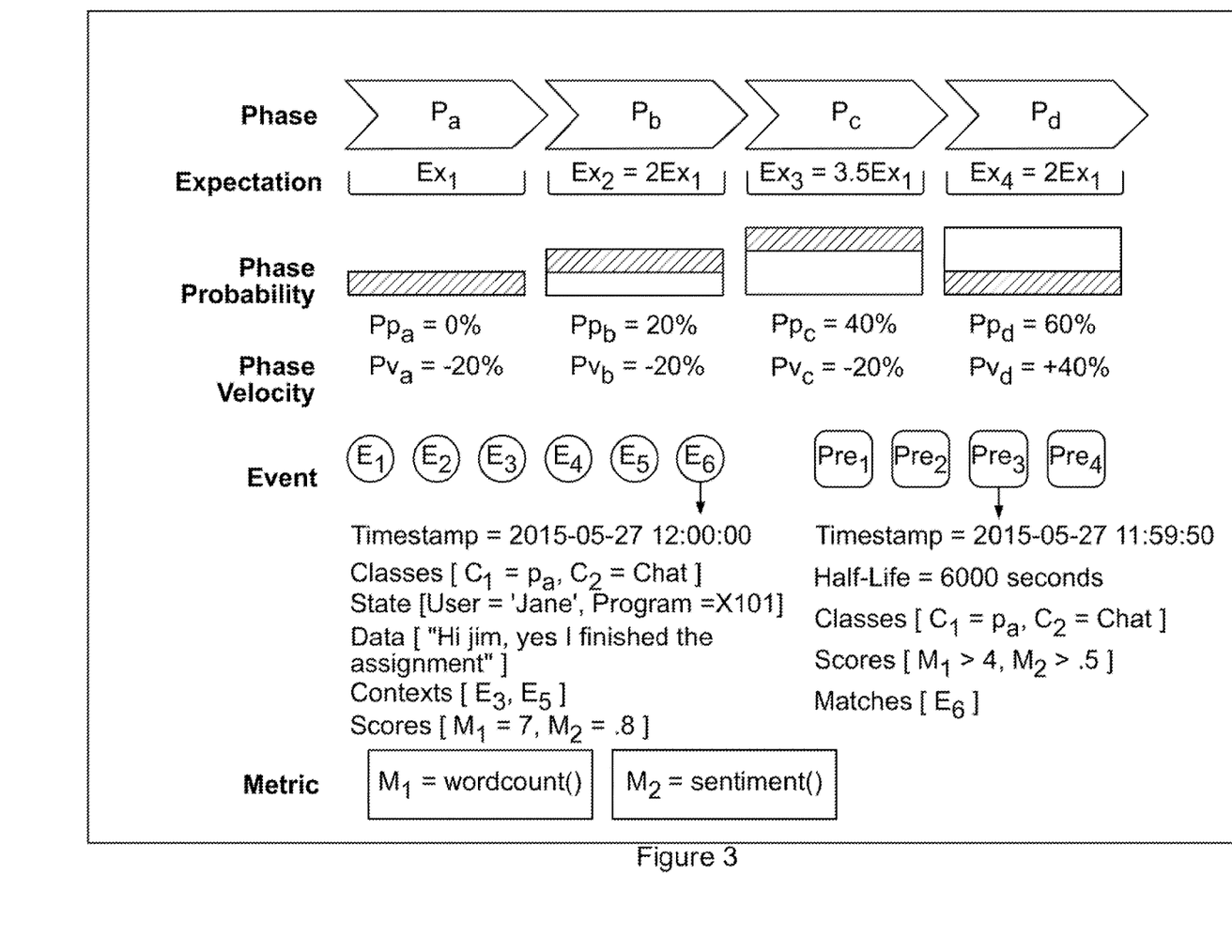
FIG. 3 is a schematic representation of empirical data indicative of an exemplary experiential learning cycle.

An exemplary probabilistic representation of the experiential learning cycle including the four above described learning phases is illustrated in FIG. 3.

An experiential learning cycle may have a plurality of characteristics. For example, an experiential learning cycle may have one or more learning phases where the last phase output is the input to the first phase. In FIG. 3, the learning phases are notated $P_a, P_b, P_c, P_d \ldots P_n$ and the entire learning cycle is notated $[P_a, P_n]$ where n is the last phase.

As the learner moves from phase to phase, the relative probability for the learner to be in a given phase will change. In an ideal experiential learning cycle, the phase probability for a single phase would be 100% and 0% for the other phases, until the phase changes, at which point the next sequential phase will show 100% probability and the other phases 0%. The Kolb Cycle, which is the experiential model used in this example, uses a probabilistic representation and a learner may appear to oscillate between phases or skip a phase. Furthermore, measuring the internal mental state of a learner is imprecise, so practical models will likely show a distribution of probabilities, e.g. a Gaussian distribution centred around the most probable phase. In FIG. 3, the probability for the learner to be in a given phase is notated $P_{pa}, P_{pb}, P_{pc}, P_{pd} \ldots P_{pn}$.

The computational model of the experiential learning cycle supports the interaction of multiple learning cycles. For a single learner, contemporaneous experiences or complex experiences may create overlapping primary learning cycles and derivative sub-cycles that are associated with the primary cycle. With multiple learners in a collaborative environment, the experiential learning cycles of one learner may influence the cycles of the other learners and are therefore interdependent.

Figure 4:
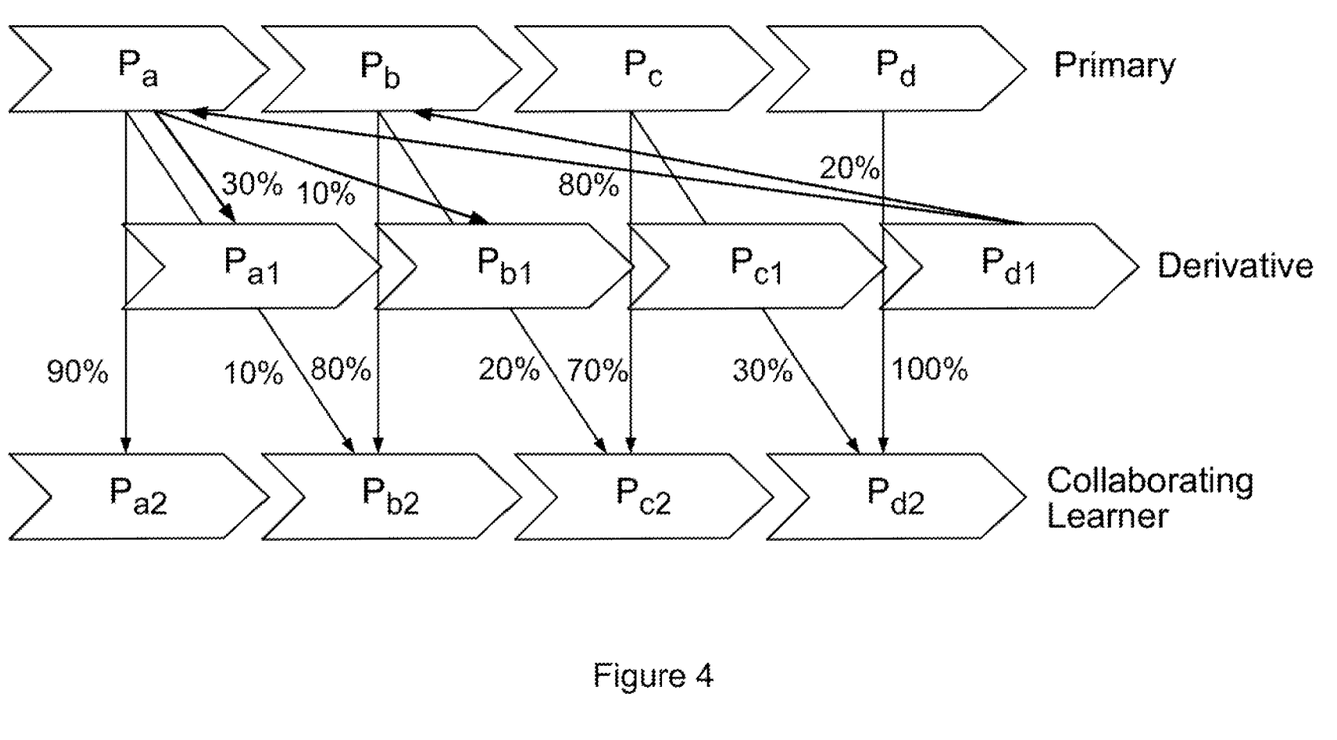
FIG. 4 is a schematic representation of empirical data indicative of multiple experiential learning cycles.

An example of overlapping interdependent learning cycles is illustrated in FIG. 4. Each phase of the primary learning cycle is linked to other cycle phases using a mesh of probabilistic vectors. Values of the probabilistic vectors may regularly be refined by re-training and thereby improving an underlying machine learning model with new event data such and data indicative of specific learning outcomes, amongst others.

Given the exemplary configuration of probabilities as shown in FIG. 4, if the learner is in phase $P_a$ of the primary learning cycle, an algorithm may calculate that there is a 30% probability that the learner will also be in phase $P_{a1}$ of a derivative cycle and a 10% probability that the learner will be in phase $P_{b1}$ of the derivative cycle. It follows that there is a 60% probability that the learner does not experience the derivative cycle. Furthermore, FIG. 4 illustrates that at the end of the derivative cycle, there is an 80% probability that the learner is in phase $P_a$ of the primary cycle and a 20% probability that the learner will have progressed to $P_b$ of the primary cycle.

These probabilities may be used to determine what event data is associated with a derivative cycle and at what period of time this event data is entered so that this event data can be filtered from an analysis of the primary learning cycle. Furthermore, the probabilities together with the event data may be analysed to determine specific circumstances that may trigger a derivative learning cycle. In addition, the data may be used to determine the progress of the one or more learners through the primary learning cycle with and without interventions.

FIG. 4 further illustrates that if the learner is currently in phase $P_a$ of the primary cycle, there is a 90% probability that a collaborating learner will be in phase $P_{az}$ of a corresponding collaborative learning cycle, and a 10% probability that the collaborating learner will be in phase $P_{b2}$ of the collaborative learning cycle. If the learner is in phase $P_b$ of the primary cycle, then there is an 80% probability that the collaborating learner will be in phase $P_{b2}$, and a 20% probability in $P_a$ of the collaborative learning cycle. This simplified example illustrates how the learning phases of the learner in the primary learning cycle influence the learning phases of the collaborating learner. It will be understood that the collaborating learner may in return influence the learner in the primary learning cycle. This influence may be different as the collaborating learner may have a stronger or weaker influence on the learner in the primary cycle.

With regard to a collaboration of multiple learners, the probabilities shown in the simplified diagram in FIG. 4 may be further processed (for example multiplied back into the phase probability for each cycle) thereby creating a composite phase probability that considers the interdependent cycles. The composite phase probabilities may be notated. This may for example be accomplished by processing event data of multiple learners using a phase determination algorithm as described above, or by processing event data of each individual learner and segregating out derivative cycles, if present, using a multi-class algorithm. The probabilities for the primary learning cycle and the probabilities for the derivative learning cycles may then be combined to determine composite phase probabilities.

A further characteristic of the experiential learning cycle relates to phase velocity which is indicative of the pace of the learner progressing through the experiential learning cycle. In light of the probabilistic learning cycle described above, the phase velocity in this example relates to a change in probabilities for each phase over time. The overall cycle velocity is a composite of the different phase velocities, which can be a simple delta between the current and previous most probable phases, or a more complex formula taking the probabilities of all phases into account, and also any overlapping and/or associated cycles. In FIG. 3, the phase velocities for given phases is notated $P_{va}$, $P_{vb}$, $P_{vc}$, $P_{vd}$ ... $P_{vn}$.

A further characteristic of the experiential learning cycle relates to the expected progress of a learner through the experiential learning cycle. Specifically, an expected progress maps one or more experiential cycles to a timeline wherein the timeline represents which phase of the experiential learning cycle the learner is expected to be at, at a given point in a learning experience. In structured learning programs, this expected progress may be predefined based on a program duration and scheduled activities. In flexible or unstructured programs the expected progress may be determined by machine learning from historical or current data such as data from other, similar learners. The expected progress may also be determined procedurally based on past events and parameters. The historical data may include learning outcomes such as learner satisfaction, grades, cycle stage estimates, that may be manually or automatically determined. This data may be used to train a prediction algorithm, such as a decision forest multi-class classifier algorithm. For example, a Kolb cycle for a specific learning experience might be defined as follows—phase CE× days, phase RO 2× days, phase AC 3× days, and phase AE 2× days. In other words, the duration of the time spent in the first CE cycle sets the "pace" for the subsequent cycles, where the RO cycle takes 2× as long, AC 3× as long, AE 2× as long. It is possible that a combination of these and other methods for specifying expectation are used. In FIG. 3, an expected process is notated $Ex_1$, $Ex_2$, $Ex_3$ ... $Ex_n$.

Event Data

When event data is received at the event data collector 206 of learning platform 102, the DBMS 208 of the learning platform 102 stores the event data in an event database 214. The event data is further processed and compared to the empirical data in the empirical database 212 to determine the progress of the learner in the experiential learning cycle. For further processing the event data, the data storage 210 further stores one or more algorithms in an algorithm database 216.

Event data relates to events that may be entered by the learner on the user computing devices 106, 108, 110 and received through the Internet 104 at the learning platform 102. Event data represents the collected and derived data associated by a learner or learning system action. In FIG. 3, events are notated $E_1$, $E_2$, $E_3$ ... $E_n$ as shown in FIG. 3.

One particular example of event data relates to chat messages. In this regard, the learning platform 102 would facilitate communications between the learner on a user computing device such as user computing device 106, 108, 110 and one or more other learners and/or educators. The event data collector 206 of the learning platform 102 automatically collects event data in the form of messages between the users. An example of chat messages between a group of users is provided below:

Bob→Alice (12:00 pm): Hi Alice, how is the assignment going?
Event: $E_1$
Timestamp=2015-01-01 12:00:00
Classes [$C_1$=AE, $C_2$=Chat]
State [User='Bob, Program=X101]
Data ["Hi Alice, how is the assignment going?"]
Contexts [ ]
Scores [$M_1$=4, $M_2$=0.5]
Alice→Bob (12:01 pm): It's going well . . . but I need some help. Do you know how to do machine learning?
Event: $E_2$
Timestamp=2015-01-01 12:01:00
Classes [$C_1$=AE, $C_2$=Chat]
State [User='Alice, Program=X101]
Data ["It's going well . . . but I need some help. Do you know how to do machine learning?"]
Contexts [$E_1$]
Scores [$M_1$=7, $M_2$=0.8]
Bob→Alice (12:02 pm): no, but check with the rest of the team.
Event: $E_3$
Timestamp=2015-01-01 12:02:00
Classes [$C_1$=AE, $C_2$=Chat]
State [User='Bob, Program=X101]
Data ["no, but check with the rest of the team."]
Contexts [$E_1$,$E_2$]
Scores [$M_1$=4, $M_2$=0.3]

Alice→Team (12:03 pm): Hi team, does anyone know machine learning?
Event: $E_4$
Timestamp=2015-01-01 12:02:00
Classes [$C_1$=AE, $C_2$=Chat, $C_3$=Group]–added a group class because of team chat
State [User='Alice, Program=X101]
Data ["Hi team, does anyone know machine learning?"]
Contexts [$E_1,E_2,E_3$]—the previous messages because it directly follows the chat and has a keyword (bold).
Scores [$M_1$=4, $M_2$=0.5]
Carol→Team (3:00 pm): Yes, I know machine learning—I did two units on it last year. What do you want to know?
Event: $E_5$
Timestamp=2015-05-27 15:00:00
Classes [$C_1$=AE, $C_2$=Chat, $C_3$=Group]—added a group class because of team chat
State [User='Carol, Program=X101]
Data ["Yes, I know machine learning—I did two units on it last year. What do you want to know?"]
Contexts [$E_2, E_4$]—the previous message because it appears to be a response, E2 because of the keyword.
Scores [$M_1$=8, $M_2$=0.7]

Event data, such as the chat messages above, may be received in binary or textual form and a number of characteristics of the event data may be derived from further processing the event data. Exemplary characteristics may include one or more of the following:

Timestamp: indicative of when the event occurred or was entered by the learner;

Content data: indicative of the raw data associated with the event. In the example of the chat messages, the content data may relate to the message itself;

Type: indicative of the type of the event, exemplary types may include: chat, post, email, phone call, set sliders, upload, attend meeting/seminar/workshop, schedule meeting. The type of the event may be weighted indicative of the probability that the event is of the associated type;

State: the "state" of the system or data source at the time of the event generation. The state might include information about the learner, such as details about the particular education program that they are accessing at the time of the event.

Context data: indicative of references to other events and/or users. For example, a chat event where user A sends to user B may reference the prior message from B to A and the prior message from A to B. Other chat messages with similar keywords may be referenced, as well as non-chat events that are considered related;

Phase: indicative of a phase of the experiential learning cycle in which the user currently is, the phase may be weighted representing a probability that the user is in the determined phase;

Class: indicative of a label given to an item or set of data to show association with other data. A classifier is an algorithm that applies classes to the event data. Each phase, expected progress, algorithm and outcome may have associated representational class labels. For example, a phase may be part of a class label. In FIG. 3, the class is notated $C_1, C_2, C_3 \ldots C_n$. It should be noted that other classifiers may be used to link data that is not formally associated. For example, tags or keywords or sentiment data may be extracted from event data, such as communication data between learners for further analysis.

Score: indicative of characteristics of the content of the event. For example, for a chat message, a score may be derived that is indicative of length, sentiment, and semantic score. A score may for example be: {'length': 30, 'sentiment'=>+0.9, 'semantic'=>0.5} representing a 30 character message with positive sentiment and where 50% of the words are semantically meaningful.

Besides chat events, there are multiple other types of event data that the learning platform can receive or generate. The following table illustrates further examples of event data together with associated phases of the experiential learning cycle.

| Phase Class | Event Action | Component | Role Class |
|---|---|---|---|
| CE | Add Idea/Concept/Post | Collaboration | Capture |
| CE | Notify Idea Followers | Collaboration | Trigger |
| CE | Ideation Metrics | Analytics | Report |
| CE | Deliver/Submit | Assessment | Capture |
| CE | Notify Submission Status | Assessment | Trigger |
| CE | Present | Assessment/Video Pitch | Capture |
| CE | Peer Review | Assessment/Video Pitch | Trigger |
| CE | Take Quiz | Assessment | Capture |
| CE | Quiz Results | Assessment | Trigger |
| RO | Give Feedback | Assessment | Capture |
| RO | Get Feedback | Assessment | Trigger |
| RO | Give Feedback | Assessment | Capture |
| RO | Get Feedback | Assessment | Trigger |
| RO | Do Reflection | Assessment | Capture |
| RO | Reflect Sentiment Report | Assessment | Trigger |
| RO | Set Sliders | Stats | Capture |
| RO | Slider Metrics feedback | Stats | Trigger |
| RO | Ideation/project comment | Collaboration | Capture |
| RO | Notify comments | Collaboration | Trigger |
| AC | Track Communication | Comms | Capture |
| AC | View Communication | Comms | Trigger |
| AC | View Lesson | Content/Project | Capture |
| AC | Recommend Lesson | Content/Project | Trigger |
| AC | Earn Achievement | Achievement | Capture |
| AC | Show Locked Achievements | Achievement | Trigger |
| AC | Ask Question | Collaboration | Capture |
| AC | Browse Questions | Collaboration | Trigger |
| AC | Attend Workshop | Project | Capture |
| AE | Have chat/video chat | Chat | Capture |
| AE | new chat notification | Chat | Trigger |
| AE | Add new task/Complete | Task/Project | Capture |
| AE | See tasks & completion | Task/Project | Trigger |
| AE | Schedule Meeting | Events | Capture |
| AE | See upcoming meetings | Events | Trigger |

Algorithms

One or more algorithms may be stored in the algorithm database 216 of the learning platform 102. The one or more algorithms may perform calculation, data processing and automated reasoning of the received event data.

For example, an algorithm, such as a decision forest algorithm or a decision jungle algorithm for creating a multi-class classification, may be applied to the event data to determine the progress of the learner through phases of the experiential learning cycle. The phases may be represented as classes in the algorithm. An alternative algorithm may use the concept of multilayer convolutional network to determine a probability associated with a phase of the experiential learning cycle. This approach may be useful when multiple learning cycles are in effect, for example due to a plurality of learners interacting with each other, or a single learner progressing through overlapping or derivative learning cycles.

In a simplified example, the type of the event data may be determined and compared with the table provided above to determine the phase in which the learner currently is.

Further, a score of the event data may be determined by applying an algorithm to the event data. For example, in the case of event data relating to a communication between two learners, a level of conflict between the two learners may be scored (for example between 0 and 1), as well as a sentiment score of the communication message between the two learners. For example, the sentiment may be within a range between −1 and 1. These scores may be generated using a two-class classifier algorithm, such as Support Vector Machine or Decision Forest. In FIG. 3, the score is notated $M_1$, $M_2$, $M_3$ . . . $M_n$, in which "M" stands for metrics. A Metric-Class association is notated M1[C1,C5] to show that Metric 1 can be applied to Events of Class 1 and Class 5.

By processing the event data, a learning outcome may be determined, notated for example $O_1$, $O_2$, $O_3$ . . . $O_n$. In this regard, the progress of a learner may be determined against relative to an outcome by applying one or more algorithms. Predefined learning outcomes may be used for training machine learning algorithms, such as supervised machine learning algorithms. For example, event data or a subset thereof may be associated with a grade for a particular learner. Event data may also be associated with an indication from a satisfaction survey. If there are several outcome measurements throughout a learning cycle, for example as a result of interim surveys or external audits, these measurements may be used to label event data that is fed into the machine learning algorithm. In this way, the machine learning algorithm can be trained to predict learning outcomes for another learner. This can also provide an estimate of the progress of the learner against the outcome. A given experiential learning program may have specific targets or estimated percentages/rates of improvement for learning outcomes.

Processing of Event Data

The event data received at the event data collector 206 may be processed and compared with the empirical data that is stored in the empirical database 212 to determine the phase in which the learner currently is.

For example, the event data may be processed to determine a class associated with the event data, the class may be associated with a phase of the experiential learning cycle. A series of algorithms may be run against the received and/or stored event data to determine additional classes and/or phases or potentially remove associated classes or phases. Specifically, in one exemplary implementation time stamps may be used to align event data and empirical data thereby creating additional event features with the empirical data. A selection of windows of combined event and empirical data may be labels with experiential phases. The labelled data may then be fed into a decision forest to train a multiclass decision forest model. The algorithm may be used to predict the class or phase for the learner's current event data window and available empirical features.

Further, association information indicative of an event context may be determined by running an algorithm against the received event data. For example, the information may be pre-determined by the computer system 100, or could be dynamically determined by matching classes. A simple match of predetermined criteria would look for exact matches of class lists and weights. A more sophisticated matching algorithm may use event intervals and/or similarity thresholds to determine a maximum distance between differing class lists which would be considered part of the same context. For example event 1 has associated classes C1 (100%), C2 (50%). Event 2 has associated classes C1 (100%), C2 (25%). Predetermined criteria of an exact match algorithm would not relate event 1 to event 2 as in being in the same context. However, a similarity threshold algorithm may determine that events 1 and 2 have been generated in the same context.

One or more algorithms may be associated with a pre-defined outcome of the experiential learning cycle. In this regard, outcomes of the learner may be updates and/or predicted outcomes for the learner may be determined.

Predictions

The event data received at the event data collector 206 of the learning platform 102 may further be processed and compared with event data that is stored in the event database 214. In this way, prediction data indicative of one or more predictions of an event in the future may be generated at a prediction generator 218. A prediction may represent a collection of events that might occur in the future. The stored event data may comprise historical event data generated by the learner and/or event data generated by one or more other learners.

Prediction data may be used to train semi-supervised machine learning algorithms, such as decision forest algorithm or multilayer convolutional matrix algorithm, and unsupervised machine learning algorithms, such as k-means clustering algorithm, that may be stored in the algorithm database. These algorithms may relate to the ones that generate the prediction data, phase determination algorithms, algorithms associated with the scores, algorithms that determine an expected progress, or algorithms that trigger an intervention, and what type of intervention would be necessary. Exemplary algorithms for generating prediction data may relate to the Bayesian logic, linear extrapolation and pattern analysis.

Prediction data may be generated having one or more of the following characteristics:

Timestamp: indicative of when the prediction data was generated;

Half-life: indicative of a rate of decay of the prediction. For example, if a prediction is generated for the response to a chat event, the prediction data may have a short half-life as past a few hours the next chat message is less likely to be part of the same conversation;

Phase: indicative of a predicted phase in which the learner will have progressed to; the phase may be weighted by the probability that the prediction will apply to a given phase;

Class: indicative of a predicted class; the class may be weighted by the probability that the prediction will apply to a given class;

Score: indicative of value for each of the algorithms that are used to generate the prediction data; for example each of the one or more future events may be predicted using a respective algorithm;

Match: indicative of events that match the prediction.

The prediction data generated by the prediction generator 218 may then be compared with the empirical data stored in the empirical database 212, such as an expected progress of the learner, to evaluate the generated prediction data. If a result of the comparison meets predetermined criteria, such as a predetermined threshold, an intervention may automatically be triggered at an intervention trigger determiner 220 (see for example FIGS. 5 and 6 as described in further detail below).

Furthermore, the prediction data may be filtered based on matching classes, half-life, interval or the like. For each predicted score, a percentage match may be determined relate to the event score. If the aggregate match percentage is greater than a threshold, the event data may be added to the list of prediction matches. This information may be used to optimise the prediction algorithm by rewarding the parameters that led to the successful prediction.

Using the previous example of the chat messages within the group, the following prediction data may have been generated at the prediction generator 218 of the learning platform 102 as a result of Alice's question to the group:
Prediction: $Pr_1$—made by AI routine A
Timestamp=2015-05-27 12:02:00
Classes [$C_1$=AE (80%), $C_2$=Chat (100%), $C_3$=Group (80%)]
Halflife=36000 seconds=10 hrs
Scores [$M_1$=2, $M_2$=0.4]—implies a short, neutral to negative answer (e.g. no, sorry, I don't)
Matches [ ]
Prediction: $Pr_2$ made by AI routine B
Timestamp=2015-05-27 12:02:00
Classes [$C_1$=AE (90%), $C_2$=Chat (100%), $C_3$=Group (80%)]
Halflife=36000 seconds=10 hrs
Scores [$M_1$=7, $M_2$=0.8]—implies a longer, positive answer
Matches [ ]

When Carol responds with event $E_5$, it matches the second prediction because it has the predicted phases, is within the half-life of the prediction and the scores are within a 10% threshold. This is a relatively high match. As a result, the prediction algorithm AI routine B that led to the generation of the prediction data may be rewarded. The reward would increase the probability of the AI routine being used for future predictions with chat messages, either generically or just for Alice. Such reward will be captured by storing the increased probability associated with the AI routine B in the algorithm database.

Furthermore, with this prediction matched, the phase probability of the users Alice and Carol for the AE phase would be increased, as the chat event is associated with that phase.

If an outcome of the experiential learning cycle relates to the collaboration of multiple learners, and an algorithm that was used to determine the outcome was the amount of positive sentiment group chat, then the collaboration outcome for both learners Alice and Carol would also likely be increased as they had an exchange that was positive in nature, as measured by the event scores.

Interventions

Interventions are phase appropriate actions that may assist the learner in progressing through the experiential learning cycle. For example, interventions may be used to accelerate the progress through the experiential learning cycle, or to repair stalled or otherwise dysfunctional cycles. Interventions may comprise feedback, information, support, and resources.

A particular example of an intervention relates to a customised reflection survey. This may be implemented to gather additional information from a learner, for example in relation to issues affecting the progress through the experiential learning cycle. Questions in the reflection survey may be determined based on a phase of the learning cycle, or a particular event triggering such intervention.

In accordance with embodiments of the present disclosure, there are a number of situations in which an intervention may automatically be triggered at the intervention trigger determiner 220 of the learning platform.

A number of examples for events that may automatically trigger an intervention are provided below:

Communication Breakdown: a lack of communication between learners or a learner and a mentor may automatically trigger an intervention. For example, a break down score indicative of the lack of communication between learners and/or mentors may be determined. This score may be combined with a corresponding sentiment score indicating dissatisfaction between the learners or the learner and the mentor. To identify this event data that automatically triggers an intervention, frequency and distribution of communication and collaboration events among and between learners and/or mentors may be measured. These measurements may be compared with other learners and/or mentors to normalise the data. For example, if a learner A and a learner B are communicating on a regular basis, and learner B and learner C are also communicating on a regular basis, but learner A and learner C are not communicating, an intervention may be triggered based on the lack of event data between learner A and learner C. In addition, the learner A or learner C may report dissatisfaction with the progress through the experiential learning progress for example by submitting a complaint to a mentor, or is not engaging in other activities such as group activities. This may further increase the breakdown score. If learners are given low feedback from a mentor or supervisor, the break down score may further increase. Once the score exceeds a predefined threshold, an intervention may automatically be triggered at the intervention trigger determiner. The predefined threshold may be based on an analysis of historical event data and learning outcomes.

When an intervention is automatically triggered at the intervention trigger determiner based on communication breakdown, learners and/or mentors may automatically receive a survey that includes question about how dynamic issues amongst the learners and/or mentors are being addressed. A further intervention may be triggered if communication between the learners and/or mentor does not improve within a predefined period of time, such as a few days. The further intervention may relates to a meeting with a mentor.

Cycle Alignment: The current or future expected progress of an experiential learning cycle is not aligned with the current or future phase or phase velocity of the learner through the cycle. By comparing at least one of the determined phase and the determined phase velocity of the learner with the empirical data, the progress of the learner can be evaluated. If a result of this comparison meets predetermined criteria, such as exceeds a predetermined threshold, an intervention may automatically be triggered at the intervention trigger determiner. This comparison may be conducted for historical, current and predicted phases and phase velocities for an experiential learning cycle.

For example, if the prediction data for a learner is associated with the CE phase, however the learner's expected progress is in the RO phase, this may be an indication that the learner's progress has stalled. An intervention event would be triggered at the intervention trigger determiner 220 and information in relation to the triggered intervention may be generated, such as the prediction data and expected progress. This information may be communicated through the Internet 104 to a user computing device, such as user computing devices 106, 108, 110. The intervention may have no outward manifestation, as it may only set parameters within the learning platform 102, such as in event data collector 206. These parameters may influence a threshold for triggering an intervention at the intervention trigger determiner 220. Additionally or alternatively, it may result in an implementation of a data presenting or data gathering interface to one or more learners, educators or mentors. For example, an educator may receive a notification that identifies a probability of a stalled learner. Alternatively, the intervention may be in the form of asking the learner to do a specific task, such as conducting a predetermined activity designed to help develop a necessary skill. The intervention may also ask one or more learners for collaboration, and data associated with that collaboration can be captured to track outcomes. This collaboration may form a derivative learning cycle.

The generated information in relation to the triggered intervention will generate event data which will be received at the event data collector 206 of the learning platform 102. In other words, a feedback loop is generated. In accordance with the steps of generating prediction data at the prediction generator 218, the intervention event data may also be used to predict future events.

Outcome Improvement: one or more outcomes or predicted outcomes may be decreasing or not increasing at an appropriate rate.

If an outcome has a target goal or rate of improvement, this may be compared against outcomes history and predicted process. For example, in the example of the chat messages above, if Alice and Carol had a protracted negative interaction, both of their collaboration outcome metrics would have decreased. If predetermined criteria are met, such as the decrease was greater than a predetermined threshold, an intervention event may be automatically triggered at the intervention trigger determiner 220. This intervention event may be communicated to the educator prompting the educator to organise a meeting to have a conversation with both Alice and Carol and trying to help them achieve a more positive dialogue. Additionally or alternatively, the intervention event may alter the user interface for Alice and Carol when they are communicating with each other through the learning platform 102. For example, communication messages between Alice and Carol may be run through sentiment analysis software and delay or stop messages being sent if the sentiment score is below a predefined threshold.

Predictability Shift: A substantial shift in the predictability of the event data generated by a learner.

One or more algorithms stored in the algorithm database 216 of the learning platform 102, such as machine learning algorithms, will eventually converge on parameters that maximise the ability to predict future events based on received event data. However, if predicted future events change beyond an expected amount, it could indicate a shift in the learner's internal state. Lowered predictability may indicate that the learner is stressed out or confused, heightened predictability may indicate boredom, disengagement, or gaming the system.

Using the example of the chat messages above, if the prediction generator 218 generated the correctly predicted responses for Alice for several days but then was unable to predict a single response because there were no appropriate responses within the half-life period, an intervention may be triggered at the intervention trigger determiner. The intervention may be in the form of an educator assessing if the team was disengaged. Further reasons for this may be that an exam period or school break may not have been taken into account. In the latter case, the educator may generate event data indicating that the triggered intervention event was incorrect. This may be used as a label for training the machine learning classification algorithms that are fed into the intervention trigger determiner 220. This may further be stored in the algorithm database 216 to recognise vacations and other breaks.

Figure 5:
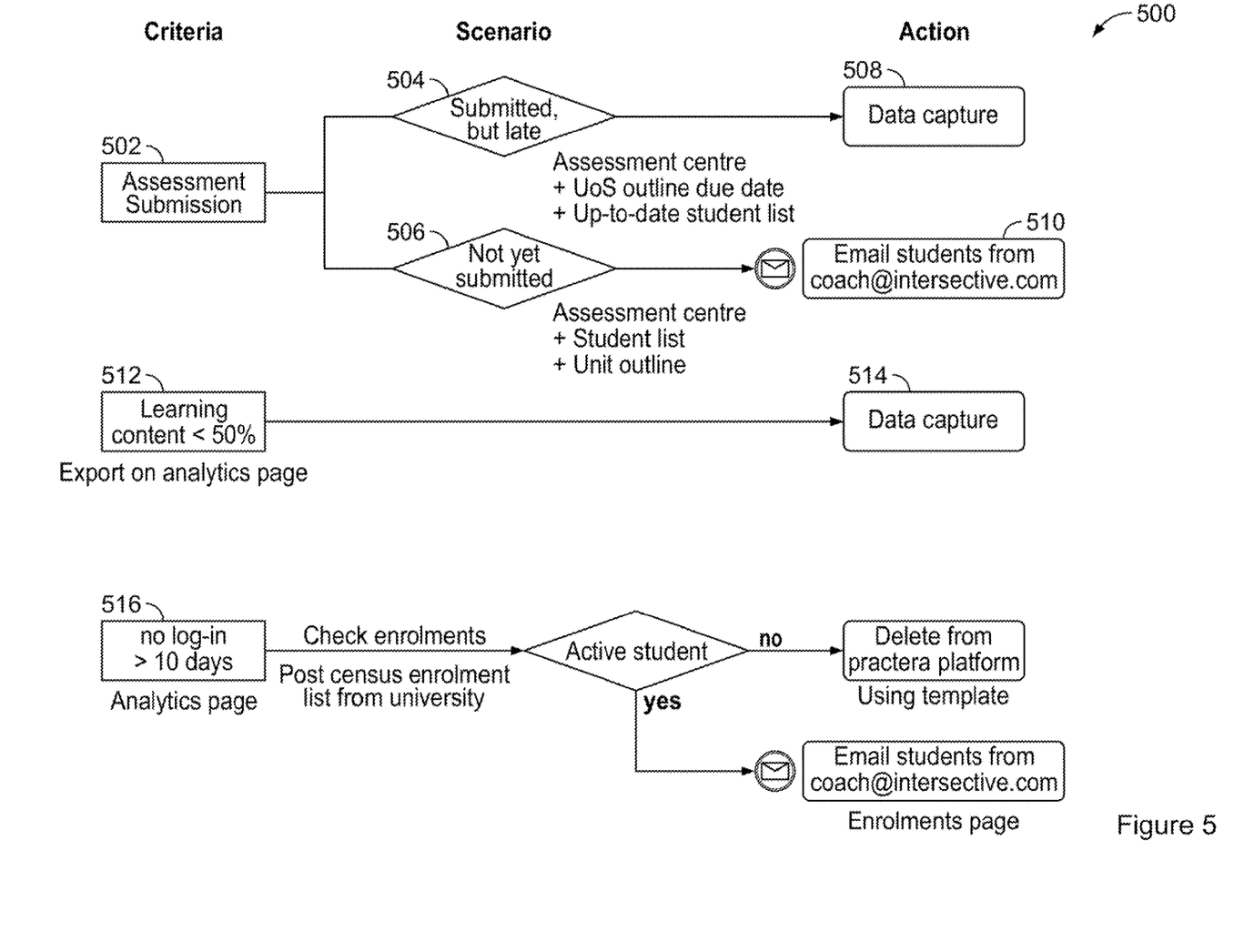
FIG. 5 shows a flow chart illustrating a method of triggering an intervention.
Figure 6:
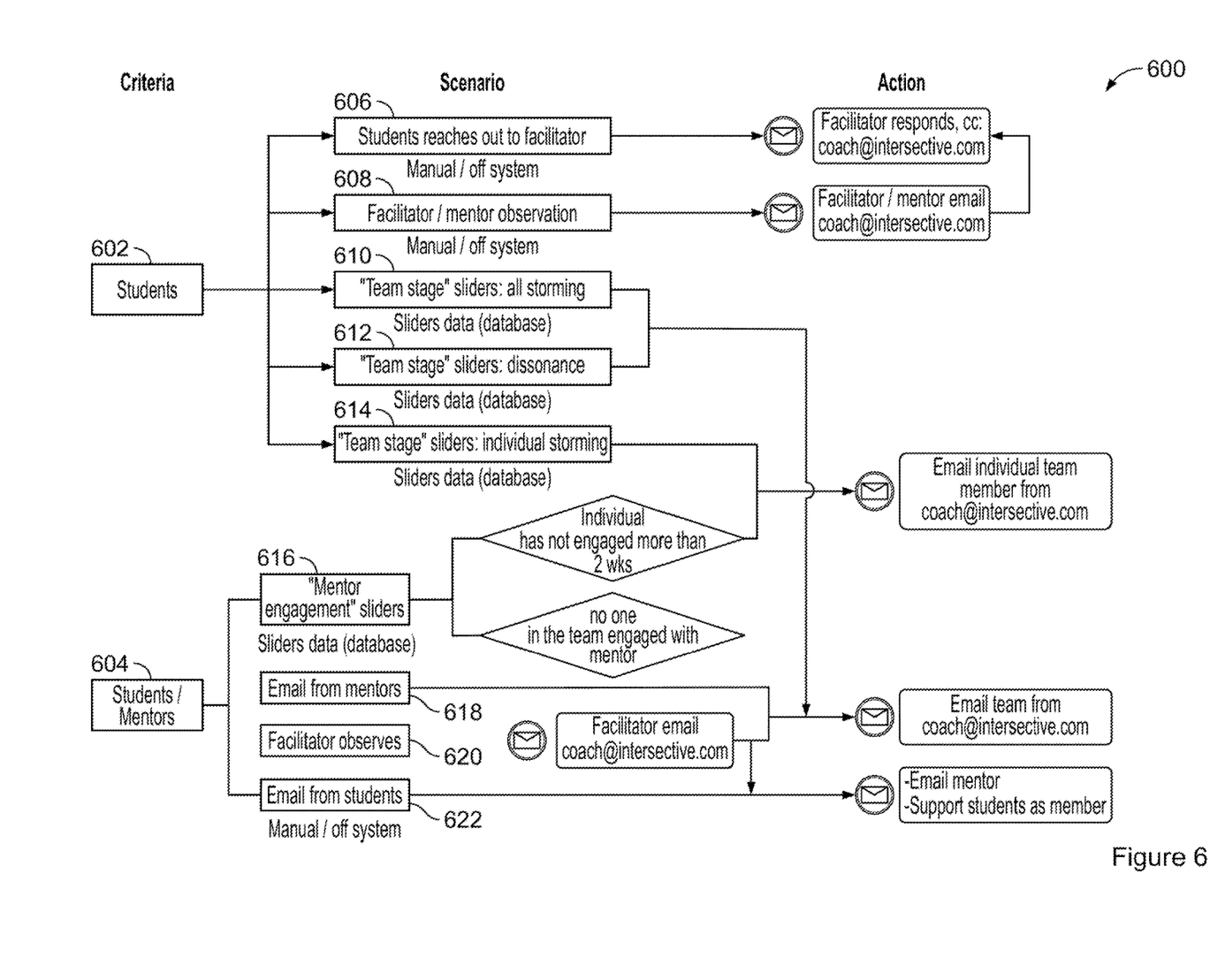
FIG. 6 shows a flow chart illustrating a further method of triggering an intervention.

Referring now to FIGS. 5 and 6, there is shown exemplary flow diagrams 500, 600 illustrating workflows for automatically triggering an intervention. The workflows may be implemented via a decision tree system based on historical data.

Referring initially to FIG. 5, there is illustrated three workflows based on three different scenarios. The first scenario 502 relates to whether an assessment has been submitted within a predefined period of time, for example by a submission deadline. If the assessment is received after the submission deadline 504, event data is collected 506 at the event data collector 206. The collected event data in relation to the submission of the assessment may be used to determine a reliability score for each learner associated with the learner's performance on tasks that are time bound. The reliability score may be generated by training a machine learning algorithm on event data and labelled accordingly, for example with early, on time or late. The reliability score may alter a predefined threshold for triggering an intervention, for example learners with a low reliability score may receive more frequent reminder notifications.

If the assessment is not received within a predefined time period 508, such as a few days after the submission deadline, an intervention in the form of an email reminder may be automatically triggered 510.

The second scenario 512 relates to the amount of learning content that is consumed by a learner. This scenario may not result in an outward manifestation and data in this regard may be captured 514 solely for determining learning outcomes, predicted data or outcomes of interventions. A positive intervention outcome may be determined if, after automatically triggering an intervention, the associated learning content was consumed or increased.

The third scenario 516 relates to learner activity. In one example, learner activity may be measured by collecting login data of a learner 518. In a further example, learner activity may be measured based on level of involvement and collaboration. If it is determined that a learner is inactive, for example by not having logged into the learning platform 102 within a predefined period, a reminder notification may be automatically triggered. For example, all inactive learners may receive reminder notifications at fixed periods. Alternatively, all learners may receive a notification indicative of an activity score. Content, timing and frequency of reminders may vary based on a learner's historic activity score, current activity score and the activity score of any collaborators.

Referring now to FIG. 6, there is shown a flow diagram 600 illustrating exemplary workflows for learners in a team. The flow diagram is broken into two categories, a first category 602 relating to interventions that are triggered due to interactions or lack of interactions between learners, and a second category 604 relating to interventions that are triggered due to interactions or lack of interactions between one or more learners and a mentor or educator.

In a first two scenarios 606, 608 of the first category 602, learners are actively engaging with a facilitator or using a system tool for directly reaching out for help. This data is captured and may be used for training an algorithm or validating/invalidating prediction data. This scenario demonstrates 100% confidence for a need of an intervention.

The next three scenarios 610, 612, 614 of the first category 602 relate to team collaboration. Interventions may be triggered based on feedback response to a regular reflection survey which asks the learners to rate the stage or phase of their team collaboration. For example, Tuckman's model of team dynamics may be used which includes the stages Forming, Storming, Norming and Performing. Different interventions may be generated depending on whether a majority of the team is in agreement (for example all learners within the team indicate that the team is in the Storming stage), whether there is relatively high dissonance among learner's perceptions (for example indications of the stage for the team are significantly different phases), or whether most learners are in agreement but one learner is in stark disagreement. The latter situation may further be cross referenced with event data to determine the nature and frequency of the intervention.

Interventions in the second category 604 may be triggered based on a series of scenarios: the result of regular reflection surveys provided to mentors 616, a mentor reaching out to an educator about their learners 618, an educator recording an observation 620, or a student reaching out to the educator about a mentor 622. In this particular example, the first scenario 616 is handled similarly to the learner only reflection survey, where the activity of learners determines the particular intervention. The other scenarios 618, 620, 622 may be tracked as direct requests for intervention and are used to validate/invalidate prediction data.

Figure 7:
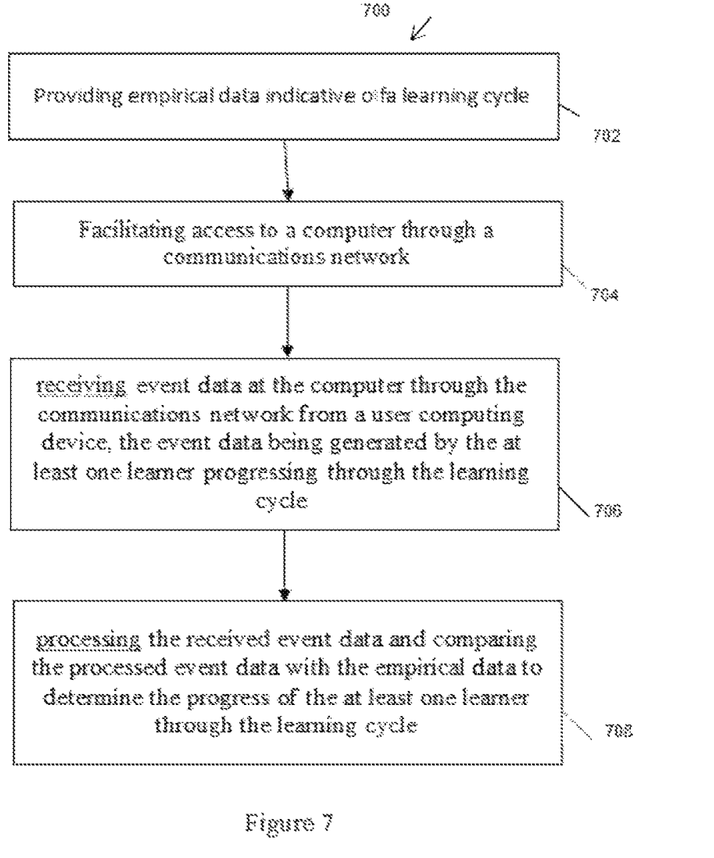
FIG. 7 is a flow chart illustrating a method of monitoring progress of at least one learner through an experiential learning cycle in accordance with an embodiment of the present disclosure.

Referring now to FIG. 7, there is shown a flow chart illustrated a computer implemented method 700 of monitoring progress of at least one learner through an experiential learning cycle. In an initial step 702, empirical data is provided indicative of a learning cycle. In a further step 704, access to the computer is facilitated through a communications network, such as the Internet. At the computer, event data is received at step 706 through the communications network and generated by the user at a user computing device. The received event data is then processed in step 708 and compared with the empirical data to determine the progress of the learner through the experiential learning cycle.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

KOLB, D. A. et al, *Experiential learning: experience the source of learning and development* (1984).

The invention claimed is:

1. A computer system for monitoring progress of a learner through an experiential learning cycle comprising a plurality of learning phases, the computer system comprising:
    a computer server accessible through a communications network, the computer server arranged to receive event data through the communications network from user computing devices, the received event data being generated by the learner progressing through the experiential learning cycle and a collaborating learner progressing through another experiential learning cycle, the experiential learning cycle and the another experiential learning cycle are interdependent cycles, the received event data being representative of data associated with activities of the learner in the experiential learning cycle;
    a memory for storing empirical data indicative of the experiential learning cycle and the received event data and operable to store computer-readable instructions; and
    a processor operable to read the computer-readable instructions, the processor when executing the computer-readable instructions is configured to:
        train a multiclass decision forest model by feeding a selection of time windows of combination of training event data and the empirical data into a decision forest, wherein the training event data comprises historical event data generated by the learner and the collaborating learner, the empirical data comprises probabilistic vectors indicative of an influence of the collaborating learner being in a specific learning phase of the another experiential learning cycle on probabilities that the learner is in each of the plurality of learning phases of the experiential learning cycle, and the combination of the training event data and the empirical data are labelled with learning phases;
        execute the trained multiclass decision forest model with the received event data as input to predict phase probabilities that the learner currently is in each of the plurality of learning phases of the experiential learning cycle, the phase probability being indicative of a likelihood that the learner is currently in an associated learning phase;
        determine the associated learning phase with a highest phase probability among the plurality of learning phases as a learning phase of the experiential learning cycle in which the learner currently is;
        evaluate the progress of the learner through the experiential learning cycle by comparing the determined learning phase with the empirical data; and
        in response to a result of the comparison meeting predetermined criteria, automatically trigger an intervention by generating information in relation to the intervention and communicating the information to related user computing devices.

2. The computer system of claim 1, wherein the processor is further configured to:
    determine the learner is in a derivative cycle of the experiential learning cycle by collecting a significant divergence in the received event data, the derivative cycle being an embedded sub-cycle of the experiential learning cycle;
    filter out event data associated with the derivative cycle from the received event data; and
    execute the trained multiclass decision forest model with the filtered event data as input to predict the phase probabilities.

3. The computer system of claim 1, wherein the processor is configured to:
    determine a phase velocity of the learner based on the received event data, wherein the phase velocity is indicative of a pace of the learner progressing through the plurality of learning phases of the experiential learning cycle;
    evaluate the progress of the learner through the experiential learning cycle by comparing the determined learning phase and the determined phase velocity of the learner with the empirical data.

4. The computer system of claim 1, wherein the processor is further configured to use the evaluation of the progress of the learner to determine a rating for the learner.

5. The computer system of claim 1, wherein the processor is further configured to compare the received event data with stored event data to generate prediction data indicative of one or more future events, the stored event data comprising historical event data generated by the learner and/or one or more other learners and/or one or more educators.

6. The computer system of claim 5 the processor is further configured to, in response to the prediction data matching with a next received event data, storing the prediction data as empirical data for training the multiclass decision forest model.

7. The computer system of claim 5 the processor is further configured to automatically trigger an intervention in response to a comparison of the prediction data with the empirical data meeting predetermined criteria.

8. The computer system of claim 1, wherein the processor is configured to compare the determined progress of the learner with a predetermined outcome of the experiential learning cycle and automatically trigger an intervention if a result of the comparison meets predetermined criteria.

9. The computer system of claim 1, wherein the event data comprises at least one of: a time stamp, a type of event, a virtual location of the generated event, content information indicative of the length of the event or sentiment and association information.

10. A computer implemented method of monitoring progress of a learner through an experiential learning cycle comprising a plurality of learning phases, the method comprising:
receiving, with a computer server accessible through a communications network, event data through the communications network from user computing devices, the received event data being generated by the learner progressing through the experiential learning cycle and a collaborating learner progressing through another experiential learning cycle, the experiential learning cycle and the another experiential learning cycle are interdependent cycles, the received event data being representative of data associated with activities of the learner in the experiential learning cycle;
training, with the computer server, a multiclass decision forest model by feeding a selection of time windows of combination of training event data and empirical data indicative of the experiential learning cycle into a decision forest, wherein the training event data comprises historical event data generated by the learner and the collaborating learner, the empirical data comprises probabilistic vectors indicative of an influence of the collaborating learner being in a specific learning phase of the other experiential learning cycle on probabilities that the learner is in each of the plurality of learning phases of the experiential learning cycle, and the combination of the training event data and the empirical data are labelled with learning phases;
executing, with the computer server, the trained multiclass decision forest model with the received event data as input to predict phase probabilities that the learner currently is in each of the plurality of learning phases of the experiential learning cycle, the phase probability being indicative of a likelihood that the learner is currently in an associated learning phase;
determining, with the computer server, the associated learning phase with the highest phase probability among the plurality of learning phases as a learning phase of the experiential learning cycle in which the learner currently is;
evaluating, with the computer server, the progress of the learner through the experiential learning cycle by comparing the determined learning phase with the empirical data; and
in response to a result of the comparison meeting predetermined criteria, automatically triggering an intervention by generating information in relation to the intervention and communicating the information to related user computing devices.

11. The method of claim 10, wherein the automatically triggering the intervention comprises facilitating the learner to progress through the experiential learning cycle by providing an education program, wherein information indicative of the education program is made accessible through the communications network to a user computer device of the learner.

12. A non-transitory machine-readable media, having instructions stored on the machine-readable media, the instructions configured to, when executed, cause a machine to:
receive event data through a communications network from user computing devices, the received event data being generated by a learner progressing through a experiential learning cycle and a collaborating learner progressing through another experiential learning cycle, the experiential learning cycle comprising a plurality of learning phases, the experiential learning cycle and the another experiential learning cycle are interdependent cycles, the received event data being representative of data associated with activities of the learner in the experiential learning cycle;
train a multiclass decision forest model by feeding a selection of time windows of combination of training event data and empirical data indicative of the experiential learning cycle into a decision forest, wherein the training event data comprises historical event data generated by the learner and the collaborating learner, the empirical data comprises probabilistic vectors indicative of an influence of the collaborating learner being in a specific learning phase of the other experiential learning cycle on probabilities that the learner is in each of the plurality of learning phases of the experiential learning cycle, and the combination of the training event data and the empirical data are labelled with learning phases;
execute the trained multiclass decision forest model with the received event data as input to predict phase probabilities that the learner currently is in each of the plurality of learning phases of the experiential learning cycle, the phase probability being indicative of a likelihood that the learner is currently in an associated learning phase;
determine the associated learning phase with the highest phase probability among the plurality of learning phases as a learning phase of the experiential learning cycle in which the learner currently is;
evaluate the progress of the learner through the experiential learning cycle by comparing the determined learning phase with the empirical data; and
in response to a result of the comparison meeting predetermined criteria, automatically trigger an intervention by generating information in relation to the intervention and communicating the information to related user computing devices.

* * * * *